March 12, 1935. W. E. SYKES 1,994,327
TESTING DEVICE
Filed Sept. 9, 1932
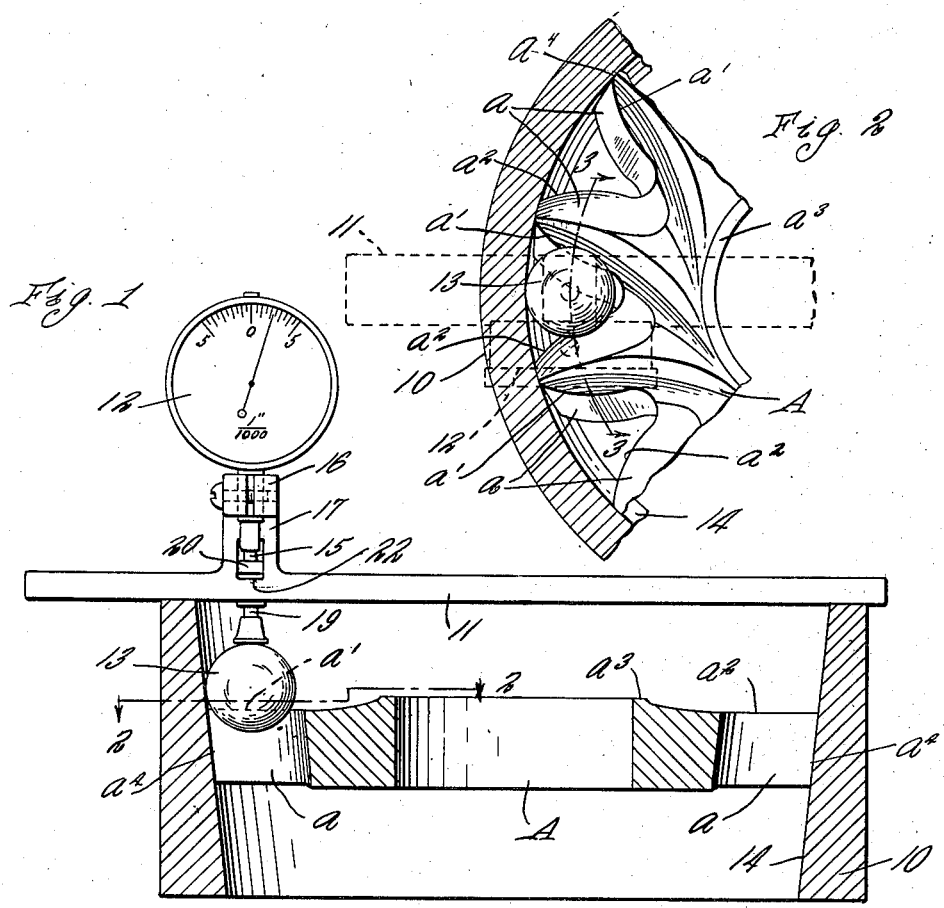
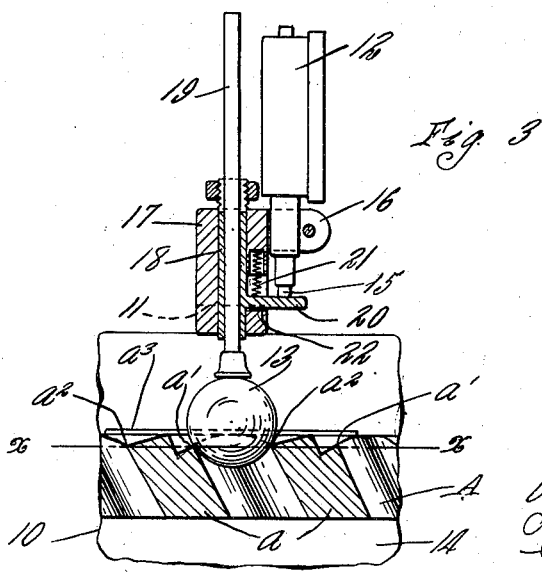
INVENTOR
William E. Sykes
by Parker, Crocknow, & Parmer
ATTORNEYS Patented Mar. 12, 1935

1,994,327

UNITED STATES PATENT OFFICE 1,994,327

TESTING DEVICE

William E. Sykes, Buffalo, N. Y., assignor to Farrel-Birmingham Company, Inc., Buffalo, N. Y.

Application September 9, 1932, Serial No. 632,434

5 Claims. (Cl. 33—201)

This invention relates to testing devices or gauges, and more particularly to devices for checking the accuracy or uniformity of relation of the cutting edges of toothed cutters, as for the purpose of insuring precise uniformity of position in the cutting edges of the several teeth of a cutter or of mating cutters.

In gear generating machines of the type shown, for example, in Patent No. 1,750,030, issued to me March 11, 1930, which are used for generating continuous, double spiral or herring-bone toothed gears, two oppositely disposed, circular toothed cutters are employed for generating the teeth. These cutters operate with a combined reciprocating and rotary motion in such a manner that one of the cutters, during the stroke of the cutters in one direction, cuts the gear blank from one edge of the blank half-way to the opposite edge, and on the opposite stroke of the cutters, the other cutter cuts the blank from its opposite edge to meet the cuts made by the first cutter. In order to produce perfect gears having teeth of precisely uniform contour and thickness throughout their length, the teeth of the two mating cutters used in the machine should be precise duplicates of each other as to the contour and relative position or location of their cutting edges, and in sharpening the cutters for the repeated use thereof, it is essential to preserve this precise duplication of relationship of the cutting edges in the companion or mating cutters.

While the testing device or gauge forming the subject matter of this application is primarily designed for use in checking the similarity of the relative positions of the cutting edges of the teeth of the mating cutters used in gear generating machines of the sort mentioned, it is not necessarily restricted to use for this particular purpose, but is also adapted for similarly checking analogous objects.

One object of my invention is to provide a practical, convenient and reliable testing device of the character stated and adapted to accomplish the above mentioned results.

Other objects of the invention are to provide a device of the character mentioned which is of simple, strong and durable construction and is adapted for use in checking toothed cutters or analogous objects of various different sizes; and also to provide a testing device or gauge having the other features of improvement and advantages hereinafter described and set forth in the claims.

In the accompanying drawing:

Fig. 1 is a sectional elevation of a testing device embodying my invention, showing a toothed gear cutter in place therein for checking.

Fig. 2 is a fragmentary, sectional plan view thereof on line 2—2, Fig. 1.

Fig. 3 is a fragmentary, sectional elevation thereof on line 3—3, Fig. 2.

A represents a toothed cutter of the sort adapted to be tested. As shown, this cutter is circular and provided with peripheral teeth $a$, each having opposite cutting edges $a'$, $a^2$ at one end of the cutter. The cutter is preferably made with a circular surface $a^3$ perpendicular to the axis of the cutter, which face is made use of in checking the cutter, as later explained. The outer or peripheral ends $a^4$ of the teeth taper or are of segmental frusto conical form, and each tooth tapers in thickness or in section on any circle concentric with the axis of the cutter, the teeth being widest at their cutting faces to provide the requisite cutting clearance. Therefore, in order to insure that all of the teeth will make cuts of uniform width or produce teeth of precisely equal thickness on the gear which is generated by the cutter, all of the cutting edges of the teeth should be in the same plane (represented by the line $x$—$x$ in Fig. 3) perpendicular to the axis of the cutter, or the corresponding cutting edges $a'$ of the several teeth should be spaced exactly the same distance from the opposite cutting edges $a^2$ of the teeth in a direction parallel with such plane $x$—$x$ perpendicular to the axis of the cutter. After each sharpening of a cutter it is therefore desirable to check it and also to check one cutter with its mating cutter in order to maintain such relation of the cutting edges.

The testing device or gauge for this purpose, in its preferred embodiment herein disclosed comprises a ring or seat 10 for the cutter or object being tested, a bridge 11 carrying an indicator 12 and adapted to rest on the upper edge of the ring with the bridge crossing the ring and supporting the indicator over the opening of the ring, and a ball or insert element 13 adapted to be placed in the space between any two adjacent teeth of the cutter so as to rest in contact with the adjacent cutting edges $a'$—$a^2$ of said teeth and with the inner surface of the ring, as indicated in Figs. 1 and 2. The insert element 13 is of symmetrical shape such that when thus placed in any tooth space it will have a three-point bearing on the inner surface of the ring 10 and on two adjacent cutting edges of the teeth. Preferably, a hardened steel bearing ball of true spherical form is employed for this element, the ball being of appropriate size to contact with the cutting edges at or approximately at the pitch line of the teeth. The ring 10 has a frusto-conical inner surface 14 having the same taper as the outer peripheral taper of the cutter so that the cutter is adapted to be placed in the ring and be supported thereon by its teeth bearing against the inner surface of the ring with the end face $a^3$ of the cutter parallel with and a definite distance from the plane of the top edge of the ring 10. If the cutter is placed in the supporting ring 10 with the end face $a^3$ of the cutter parallel with the plane of the top edge of the ring, and if the spacing or disposition of the opposed cutting edges $a'$, $a^2$ of the teeth is uniform throughout, it will be manifest that when the ball 13 is placed as explained, in the space between any two teeth of the cutter, the top of the ball will be always at the same elevation or the same distance from the plane of the top edge of the ring, whereas any variation in the spacing of the cutting edges $a'$, $a^2$ of different teeth would cause variations in the elevation of the ball 13, which variations may be shown by a gauge or indicator 12 of any suitable type.

The indicator 12 shown is a dial micrometer gauge of ordinary construction having a graduated dial and a finger adapted to be rotated in front of the dial by the movement of a vertically movable plunger 15. The indicator is secured in fixed position on the bridge 11, as by being clamped in a split collar 16 on an upstanding post or portion 17 of the bridge. Movable vertically in a guide hole or way in this post, is an actuating member 18 carrying a contact rod 19 adapted to bear at its lower end against the top of the ball 13. The actuating member has a lateral arm 20 which is adapted to engage the lower end of the gauge plunger 15 for lifting the latter. A suitable spring 21 pressing on the actuating member normally holds this member down against a stop face 22 on the post. Preferably the actuating member is tubular and the rod 19 is adjustable vertically in the tube, the rod being secured in adjusted positions therein, as by a nut screwed on the split upper end of the tube 18, so that by tightening the nut the split end of the tube will be contracted and firmly grip the contact rod. The contact rod is made thus adjustable in the actuating member of the indicator so that the rod can be readily set roughly, as may be required for use in testing cutters of different sizes which will occupy different elevations in the supporting ring 10.

The method of using the testing device for checking toothed cutters or analogous objects is as follows:

A cutter is placed in the seat ring 10 in which it is supported, as shown in Fig. 1, by the tapered, inner surface of the ring, and is checked for correct location by placing the bridge across the upper end of the ring with the contact rod 19 of the indicator making contact with the end face $a^3$ of the cutter, the contact rod being adjusted, if necessary, to appropriate height in the member 18. The bridge is then turned on the top of the ring maintaining contact of the rod 19 with the face $a^3$, and when the cutter is correctly located, no movement of the indicator finger will occur.

A ball 13 is then placed in one of the tooth spaces of the cutter, in contact with two cutting edges, and the inner surface of the ring, as explained. Then the contact rod 19 of a second bridge unit, is set, as required, for the indicator to register while the contact rod rests on the ball. The same reading must be maintained with the ball 13 in any tooth space. When checking mating cutters the tooth space readings from the ball 13 must be identical for both cutters. The cutters could be checked with a single bridge unit only, but this would necessitate changing the setting of the contact rod thereof between the tests for location of the cutter in the ring and that for tooth spacing. Therefore, the provision of two bridge units is more convenient.

It will be understood that the device is adapted for checking cutters or the like of any size adapted to be placed in and supported by the ring, as explained.

Having thus described my invention, I claim:

1. A device for checking the relation of spaced portions of objects having spaced peripheral portions, comprising a support having parts arranged to engage and retain such an object in a definite location relative to said support, a freely movable symmetrical element adapted to be placed in contact with two opposed spaced portions of the object and a fixed part of the support whereby the position of the element is determined, and an indicator mounted on the support and adapted to contact with the element to show variations in location of said element relatively to a given part of said support when the element is so positioned.

2. A device for checking the relation of spaced peripheral portions of objects, comprising a seat by which such an object is held in a definite location and which has a surface surrounding the periphery of such object, and an element which is retained by said surface in contact therewith and with two such spaced portions, and an indicator which shows the location of said element relatively to a part of said seat when said element is so retained.

3. A device for checking the relation of portions of the teeth of peripherally toothed objects, comprising an internally tapered ring in which such an object is held by contact with the tapered inner surface of the ring, a symmetrical element adapted to be placed between any adjacent two such teeth in contact with the edges thereof and with said tapered surface, and an indicator which shows the location of said element relatively to the plane of an end of said ring.

4. A device for checking the relation of portions of the teeth of objects having peripheral teeth with tapered outer ends, comprising a ring having a correspondingly tapered inner surface by which such an object is held in a definite location, a symmetrical element adapted to be placed between any adjacent two such teeth in contact with the edges thereof and with said tapered surface, and an indicator which shows any variations in the location of said element relatively to the plane of an end of said ring when the element is placed between different adjacent such teeth.

5. A device for checking the relation of portions of the teeth of peripherally toothed objects, comprising an internally tapered ring in which such an object is held by contact with the tapered inner surface of the ring, a symmetrical element adapted to be placed between any adjacent two such teeth in contact with the edges thereof and with said tapered surface, an indicator, and a support for the indicator arranged to bear against an end of said ring and support the indicator with its contact member in contact with said element in the different positions thereof and thereby show any variations in location of said element relatively to the plane of said end of the ring when said element is placed between different adjacent such teeth.

WILLIAM E. SYKES.